United States Patent [19]
Mestha et al.

[11] Patent Number: 5,784,667
[45] Date of Patent: Jul. 21, 1998

[54] TEST PATCH RECOGNITION FOR THE MEASUREMENT OF TONE REPRODUCTION CURVE FROM ARBITRARY CUSTOMER IMAGES

[75] Inventors: Lingappa K. Mestha, Fairport; Thomas Allen Henderson, Rochester, both of N.Y.

[73] Assignee: Xerox Corporation, Stamford, Conn.

[21] Appl. No.: 754,907

[22] Filed: Nov. 22, 1996

[51] Int. Cl.⁶ .............. G03G 15/00; G03G 15/08
[52] U.S. Cl. .............. 399/49; 399/53; 399/60
[58] Field of Search .............. 399/49, 53, 60

[56] References Cited

U.S. PATENT DOCUMENTS

| | | | |
|---|---|---|---|
| 4,341,461 | 7/1982 | Fantozzi | 399/49 |
| 5,060,013 | 10/1991 | Spence | 399/72 |
| 5,450,165 | 9/1995 | Henderson | 399/49 |
| 5,576,811 | 11/1996 | Kobayashi et al. | 399/60 |

*Primary Examiner*—William J. Royer
*Attorney, Agent, or Firm*—Ronald F. Chapuran

[57] ABSTRACT

A method of development control by storing a reference tone reproduction curve and sensing a relatively small segment of an arbitrary image on an imaging surface. The relatively small segment of the arbitrary image on the imaging surface is then converted into suitable density values, such as background, solid area, and halftone and a control responds to the density values to adjust the machine operation for print quality correction.

23 Claims, 8 Drawing Sheets

TEST PATCH RECOGNITION FOR THE MEASUREMENT OF TONE REPRODUCTION CURVE FROM ARBITRARY CUSTOMER IMAGES

BACKGROUND OF THE INVENTION

The invention relates to xerographic process control, and more particularly, to the use of arbitrary customer images to provide sufficient data for the measurement of a tone reproduction curve.

In copying or printing systems, such as a xerographic copier, laser printer, or ink-jet printer, a common technique for monitoring the quality of prints is to artificially create a "test patch" of a predetermined desired density. The actual density of the printing material (toner or ink) in the test patch can then be optically measured to determine the effectiveness of the printing process in placing this printing material on the print sheet.

In the case of xerographic devices, such as a laser printer, the surface that is typically of most interest in determining the density of printing material thereon is the charge-retentive surface or photoreceptor, on which the electrostatic latent image is formed and subsequently, developed by causing toner particles to adhere to areas thereof that are charged in a particular way. In such a case, the optical device for determining the density of toner on the test patch, which is often referred to as a "densitometer", is disposed along the path of the photoreceptor, directly downstream of the development unit. There is typically a routine within the operating system of the printer to periodically create test patches of a desired density at predetermined locations on the photoreceptor by deliberately causing the exposure system thereof to charge or discharge as necessary the surface at the location to a predetermined extent.

The test patch is then moved past the developer unit and the toner particles within the development unit are caused to adhere to the test patch electrostatically. The denser the toner on the test patch, the darker the test patch will appear in optical testing. The developed test patch is moved past a densitometer disposed along the path of the photoreceptor, and the light absorption of the test patch is tested; the more light that is absorbed by the test patch, the denser the toner on the test patch.

In any printing system using test patches for monitoring print quality, a design problem inevitably arises of where to place these test patches, particularly on photoreceptor belts or drums. Xerographic test patches are traditionally printed in the interdocument zones on the photoreceptor. They are used to measure the deposition of toner on paper to measure and control the tone reproduction curve (TRC). Generally each patch is about an inch square that is printed as a uniform solid half tone or background area. This practice enables the sensor to read one value on the tone reproduction curve for each test patch. However, that is insufficient to complete the measurement of the entire curve at reasonable intervals, especially in a multi-color print engine. To have an adequate number of points on the curve, multiple test patches have to be created.

Thus, the traditional method of process controls involves scheduling solid area, uniform halftones or background in a test patch. Some of the high quality printers contain many test patches. During the print run, each test patch is scheduled to have single halftone that would represent a single byte value on the tone reproduction curve. This is a complicated way to increase the data bandwidth required for the process control loops. It also consumes customer toner for printing many test patches. For example, U.S. Pat. No. 5,060,013 discloses a control system using test patches at different locations within the image frame on the photoreceptor. A plurality of sensors are arranged to sample the test areas in defined columns of the frame and measurements coordinated with the location of the test area.

It is also known in the prior art, for example, U.S. Pat. No. 4,341,461 to provide two test targets, each having two test patches, selectably exposed to provide test data in the photoreceptor image area for control of the toner dispensing and bias control loops. In this system, the test patches are imaged in interdocument zones on the photoreceptor. In addition, U.S. Pat. No. 5,450,165 discloses the use of incoming data or customer image data as a test patch. In particular, incoming data is polled for preselected density conditions to be used for test patches to monitor print quality.

It is also known, in pending U.S. application Ser. No. 08/527,616 filed Sep. 13, 1995, now known as Pat. No. 5,543,896, to provide a single test pattern, having a scale of pixel values, in the interdocument zone of the imaging surface and to be able to respond to the sensing of the test pattern and a reference tone reproduction curve to adjust the machine operation for print quality.

One difficulty with the prior art is the need for several separate test patches, whether in the image area or interdocument zone of the imaging member to provide test data. The use of multiple test patches, independent of the actual images to be printed, unnecessarily depletes the system of toner and adds to the complexity of control. Another difficulty in the prior art, such as disclosed in Pat. No. 5,450,165 is the need to poll incoming data for preselected density conditions, such as various halftone conditions, to be used for test patches to monitor print quality.

It would be desirable, therefore, to be able to eliminate the need for separate test patches to measure and control a tone reproduction curve, and to be able to provide a relatively simple method to produce and measure various halftone conditions to adjust the machine operation for print quality.

It is an object of the present invention therefore to provide a new and improved technique for establishing print quality by the use of small incidental test patches of an arbitrary input data stream to extract suitable halftone characteristics. It is another object of the present invention to be able to sense small areas of an arbitrary input document to provide tone reproduction curve data to adjust the machine operation for print quality. Other advantages of the present invention will become apparent as the following description proceeds, and the features characterizing the invention will be pointed out with particularity in the claims annexed to and forming a part of this specification.

SUMMARY OF THE INVENTION

The present invention is concerned with a method of development control by storing a reference tone reproduction curve and sensing a relatively small segment of an arbitrary image on the imaging surface. The relatively small segment of the arbitrary image is then converted into suitable density values, such as background, solid area, and halftone. A control responds to the density values and the tone reproduction curve to adjust the machine operation for print quality correction.

For a better understanding of the present invention, reference may be had to the accompanying drawings wherein the same reference numerals have been applied to like parts and wherein:

DETAILED DESCRIPTION OF THE DRAWINGS

DETAILED DESCRIPTION OF THE PREFERRED EMBODIMENT

Figure 1:
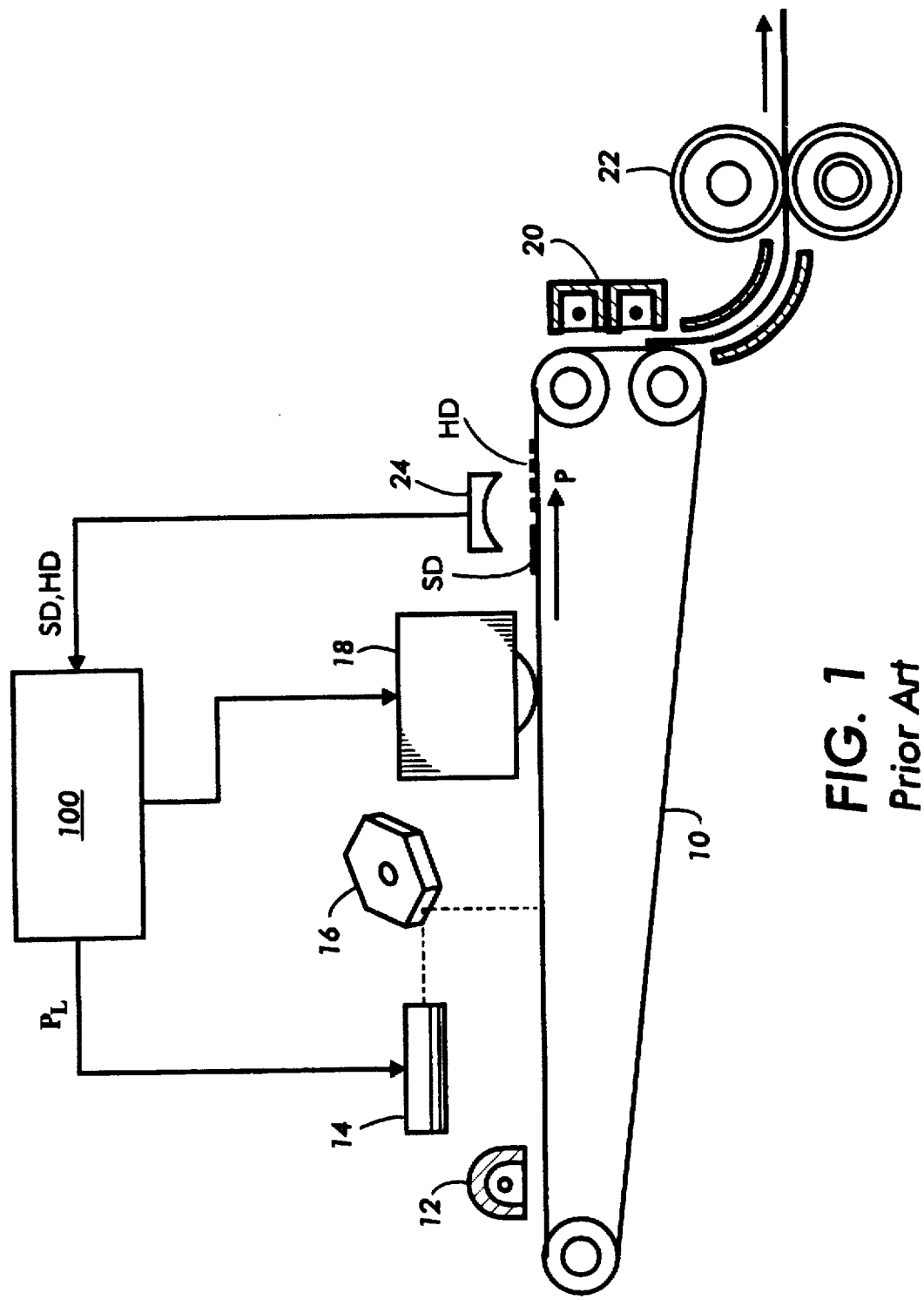
FIG. 1 is an elevational view illustrating a typical electronic imaging system incorporating tone reproduction curve control in accordance with the present invention.

FIG. 1 shows the basic elements of the well-known system by which an electrophotographic printer or laser printer uses digital image data to create a dry-toner image on plain paper. There is provided in the printer a photoreceptor 10, which may be in the form of a belt or drum, and which comprises a charge-retentive surface. The photoreceptor 10 is here entrained on a set of rollers and caused to move (by means such as a motor, not shown) through process direction P. Moving from left to right in FIG. 1, there is illustrated the basic series of steps by which an electrostatic latent image according to a desired image to be printed is created on the photoreceptor 10, subsequently developed with dry toner, and transferred to a sheet of plain paper.

The first step in the electrophotographic process is the general charging of the relevant photoreceptor surface. As seen at the far left of FIG. 1, this initial charging is performed by a charge source known as a "scorotron", indicated as 12. The scorotron 12 typically includes an ion-generating structure, such as a hot wire, to impart an electrostatic charge on the surface of the photoreceptor 10 moving past it. The charged portions of the photoreceptor 10 are then selectively discharged in a configuration corresponding to the desired image to be printed, by a raster output scanner or ROS, which generally comprises laser source 14 and a rotatable mirror 16 which act together, in a manner known in the art, to discharge certain areas of the charged photoreceptor 10. Although a laser source is shown to selectively discharge the charge-retentive surface, other apparatus that can be used for this purpose include an LED bar, or, conceivably, a light-lens system. The laser source 14 is modulated (turned on and off) in accordance with digital image data fed into it, and the rotating mirror 16 causes the modulated beam from laser source 14 to move in a fast-scan direction perpendicular to the process direction P of the photoreceptor 10. The laser source 14 outputs a laser beam of laser power PL which charges or discharges the exposed surface on photoreceptor 10, in accordance with the specific machine design.

After certain areas of the photoreceptor 10 are (in this specific instance) discharged by the laser source 14, remaining charged areas are developed by a developer unit such as 18 causing a supply of dry toner to contact the surface of photoreceptor 10. The developed image is then advanced, by the motion of photoreceptor 10, to a transfer station including a transfer scorotron such as 20, which causes the toner adhering to the photoreceptor 10 to be electrically transferred to a print sheet, which is typically a sheet of plain paper, to form the image thereon. The sheet of plain paper, with the toner image thereon is then passed through a fuser 22, which causes the toner to melt, or fuse, into the sheet of paper to create the permanent image.

The idea of "print quality" can be quantified in a number of ways, but two key measurements of print quality are (1) the solid area density, which is the darkness of a representative developed area intended to be completely covered by toner and (2) a halftone area density, which is the copy quality of a representative area which is intended to be, for example, 50% covered with toner. The halftone is typically created by virtue of a dot-screen of a particular resolution, and although the nature of such a screen will have a great effect on the absolute appearance of the halftone, as long as the same type of halftone screen is used for each test, any common halftone screen may be used. Both the solid area and halftone density may be readily measured by optical sensing systems which are familiar in the art. As shown, a densitometer generally indicated as 24 is here used after the developing step to measure the optical density of a solid density test patch (marked SD) or a halftone density test patch (HD) created on the photoreceptor 10 in a manner known in the art. Systems for measuring the true optical density of a test patch are shown in, for example, U.S. Pat. No. 4,989,985 or U.S. Pat. No. 5,204,538, both assigned to the assignee hereof and incorporated by reference herein. However, the word "densitometer" is intended to apply to any device for determining the density of print material on a surface, such as a visible-light densitometer, an infrared densitometer, an electrostatic voltmeter, or any other such device which makes a physical measurement from which the density of print material may be determined. Controller 100 responds to densitometer 24 to provide control signals to laser source 14 and developer unit 18.

Figure 2:
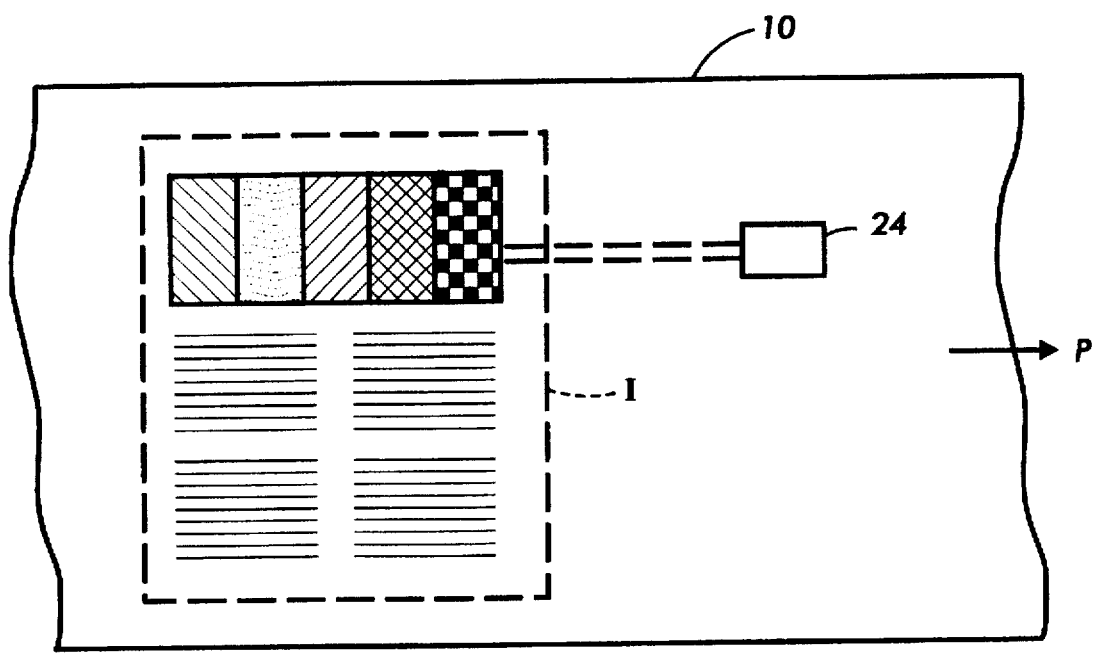
FIGS. 2 and 3 are plan views of a portion of a photoreceptor illustrating operation of the system in accordance with the present invention.
Figure 3:
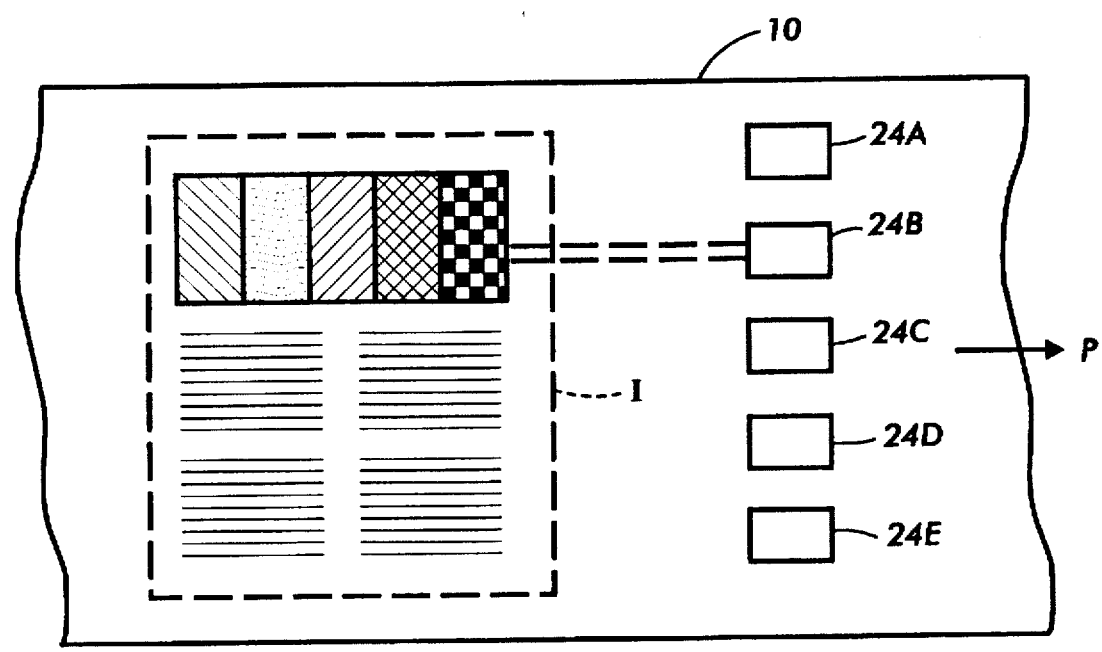
Figure 4A:
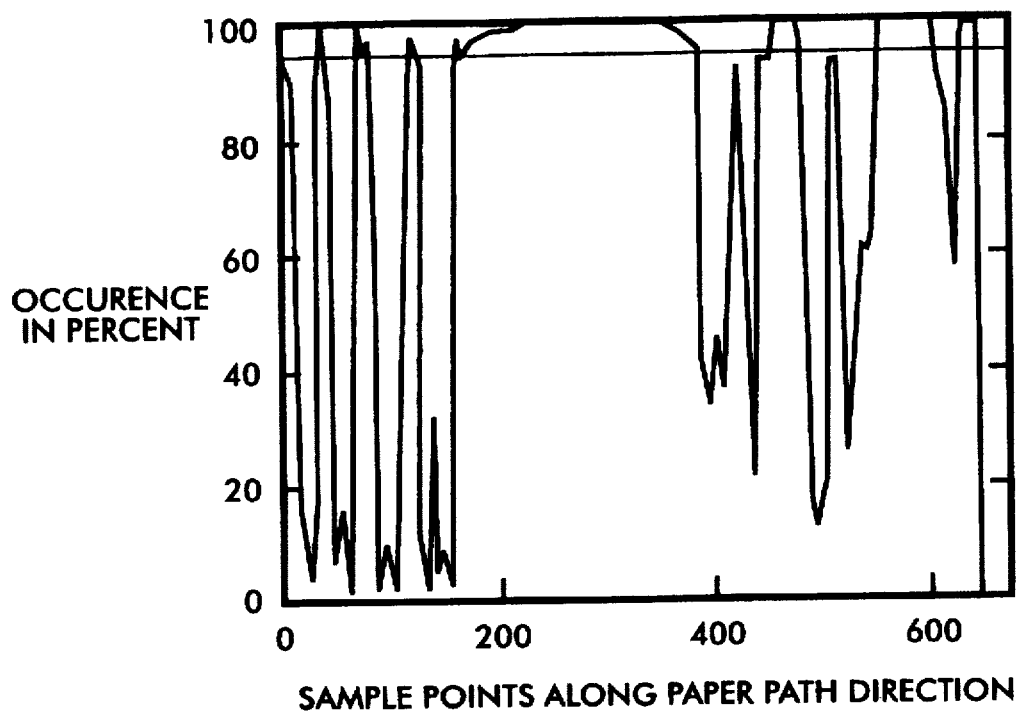
FIGS. 4A, 4B, 5A, 5B illustrate a first sample of histogram data, predicted sensor output, ESV output, and TRC curve in accordance with the present invention.
Figure 4B:
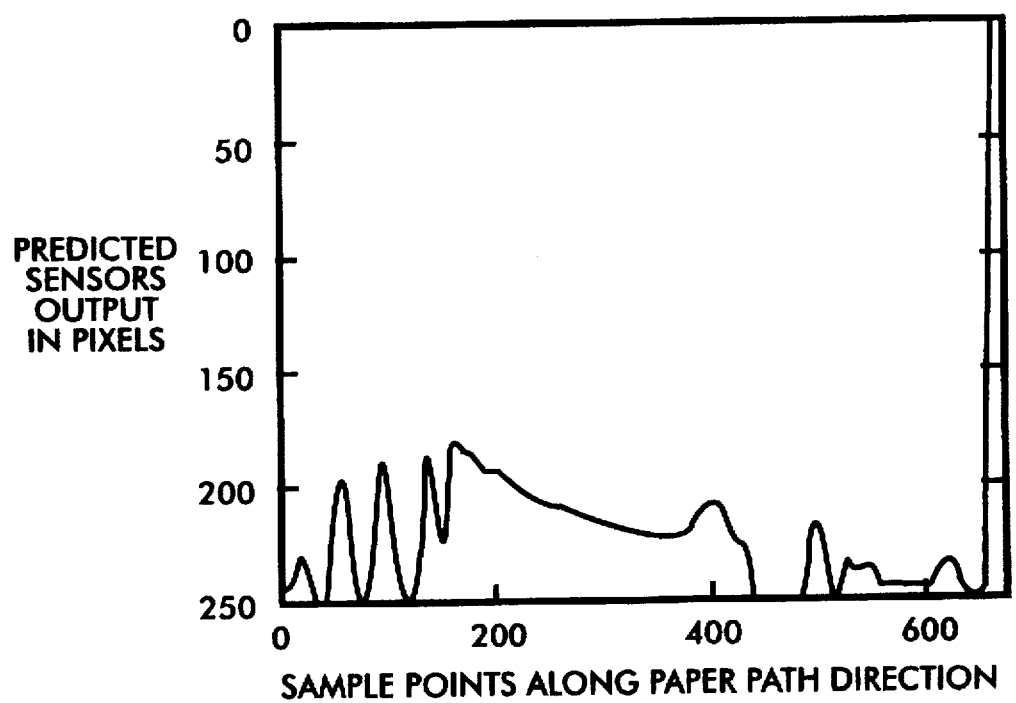

FIGS. 2 and 3 are plan views of a section of the photoreceptor belt 10, which moves in the process direction P, particularly in the area of the electrophotographic printer immediately downstream of the developer unit 18. Superimposed in the plan view of FIG. 2 is a densitometer 24, disposed along an axis perpendicular to the process direction P to permit the densitometer to sample a "swath" along the photoreceptor belt 10 as it moves in the process direction. There may, according to the invention, be provided a plurality of densitometers, each sampling a different "swath" along the photoreceptor belt 10 so that more of the photoreceptor width may conceivably be capable of detection by one or another densitometer. Also shown superimposed on the photoreceptor belt 10 is a developed electrostatic image indicated as I, which at this stage in the process of printing has just been electrostatically developed by developer unit 18. The image I is shown reversed, as this latent image will subsequently be transferred to form a positive image onto a sheet.

It will be noted that, in FIG. 2, the image I is illustrated to include various gray level and solid-density areas (for sake of illustration, shown as cross-hatched). The particular darkened area of image I will pass under densitometer 24, as the developed latent image moves from the developer unit 18 to the transfer station. Thus, as the developed latent image I moves past densitometer 24, densitometer 24 will have an opportunity to examine an area of a given size and density, much in the manner of a deliberately-created test patch, which happens to be already in the image to be printed by the user.

The densitometer 24 having exposure to various swaths from several and arbitrary developed latent images allows a control system access to which is in effect a "test patch" which has been created incidental to an image which was being created by the user anyway. The advantage of this idea is that no deliberate test patches need be made in interdocument zones along the length of the photoreceptor; among other advantages, this increases the amount of usable length on the photoreceptor belt 10, and may also facilitate the use of a photoreceptor drum with a relatively small circumference.

In the present invention, it is not necessary to preview incoming digital image data being used to create the particular electrostatic latent image to discover areas within the created image having the requisite toner density to serve as a test patch. In general, in order to serve as a test patch, there only must be provided in the image, within the area accessible to the densitometer 24, an area providing a minimum time-window in which to measure the density of a test patch moving past.

Test patches have usually been printed in interdocument zones, on photoreceptor belts, or drums. Generally, each test patch is about a square inch in area and is printed as a solid area or possibly a single halftone patch. For complete control of a tone reproduction curve many samples of input pixel and printed halftone must be acquired. To increase the rate of test patch measurement, test patches could be scheduled more often. Printing test patches, however, uses customer toner and printer time. U.S. Pat. No. 5,450,165 shows that "incidental" test patches, such as illustrated by sensor measurements shown at 24A, 24C, 24D, and 24E, in addition to patch measurement 24B, found in customer images can be used together with interdocument zone patches to increase the TRC measurement rate. Incidental test patches were identified from the input byte stream as areas of constant input pixel value at least as large as patches in interdocument zones.

The requirement that large areas of stable input be present in customer images, however, severely limits the number of incidental test patches that can be found in a customer image. Many images contain stable input within areas much smaller than typical interdocument patches. The smaller the area of an incidental test patch the better the chance of extracting more information in a given print. In accordance with the present invention, a method is shown of collecting incidental test patches of very small size. The result is that much more data for process control can be extracted from a customer image.

It is logical to think that the area of an incidental test patch can be made equal to the minimum area that can be sensed with a particular sensor viewing the photoreceptor or paper surface. Sensors such as the ESV, ETAC, or paper densitometer have an aperture on the order of millimeters, that specifies the sensor view area. This view area not only depends on the physical aperture but also is a function of how far it is located above the photoreceptor surface. The sensitivity of the sensor may also vary within its aperture. In addition, the sensor may have some inherent response time, based on the sensing elements and supporting electronics. A very accurate location on the image surface is also important since an exact correspondence between the image data along the sensor line and the sensor output is required. All these characteristics must be known in detail to determine the minimum size of an incidental test patch.

Test patterns can be used to measure the required sensor characteristics of a given sensor. Data acquired from the sensor as the patterns are exposed on the charged photoreceptor and passed beneath an ESV can be used to determine the sensor location and aperture to an accuracy of one pixel in relation to the image frame and an effective aperture determined.

With a complete characterization of a sensor, the input byte stream can be analyzed by applying the sensor viewing area to the input data in accordance with the data acquisition rate from the sensor. At each point where data is acquired, the ESV sensor is viewing a particular area of the photoreceptor that corresponds to a particular set of image bytes from the input data stream. While the input is analyzed as an array of bytes, the sensor is actually observing the halftoned version of the byte input. Also, the halftone screening process must be understood to properly analyze the input bytes.

Halftone screening is the process of converting continuous tone image representation (one byte per pixel) into the bit stream that instructs the ROS to turn on or off at each photoreceptor location. If the input byte stream is a steady byte value over a large area, the result on the photoreceptor will be a regular array of halftone dots. The halftone dots are so small that the sensor reads only the integrated voltage that results. The correspondence between the single byte input and the average over the resulting regular array of halftone dots allows measurement of a point on the tone reproduction curve.

The halftone screen process need not always produce the regular array of halftone dots that results from a large area at a single input byte value. The input value can change rapidly over small image space, resulting in an arrangement of shapes that bear little resemblance to a halftone dot.

For example, the byte input may express a series of closely spaced lines. The sensor will read an average value from the lines and the input byte values in the sensor aperture will average to some single value. This data, however, does not belong in a tone reproduction curve and must be rejected for the purpose of measuring the TRC. The following technique was used to detect the presence of pure halftoned image.

Let m be the normalized mean value of the input image data. While calculating the mean value, the input image area is selected for the aperture as determined above. Also let $p(i,j)$ be equal to the difference between the normalized mean value, m, and the actual image bytes. If $s(i,j)$ is the weightings attached to the sensor profile, then the variation $e(i,j)$ is generated in the algorithm by subtracting the product of $p(i,j)$ and $s(i,j)$ from the mean value m. Here i and j represent the ith column and jth row of the image bytes. A preset tolerance value is compared to the error, $e(i,j)$. When the tolerance value is less than or equal to $e(i,j)$ for a given image pixel in the aperture, it is defined that there will be an "occurrence" of the image pixel for that particular tolerance. If all the image pixels $p(i,j)$ are within the tolerance value then the total number of occurrences is considered equal to the number of pixels enclosed by the aperture. In other words, we assign a score of 100%. In some cases when the variation is too big (i.e., when $e(i,j)$ becomes greater than the tolerance value) the total number of occurrences will be less than the total number of pixels. Thus, a flat image pixel surface variation will score 100%. A predetermined confidence value (for example, 95%) is used in the algorithm to distinguish relatively stable image data from high frequency changes. All sensed areas on the image surface with occurrences above the confidence value are regarded as halftoned images of interest to determine the TRC.

Figure 5A:
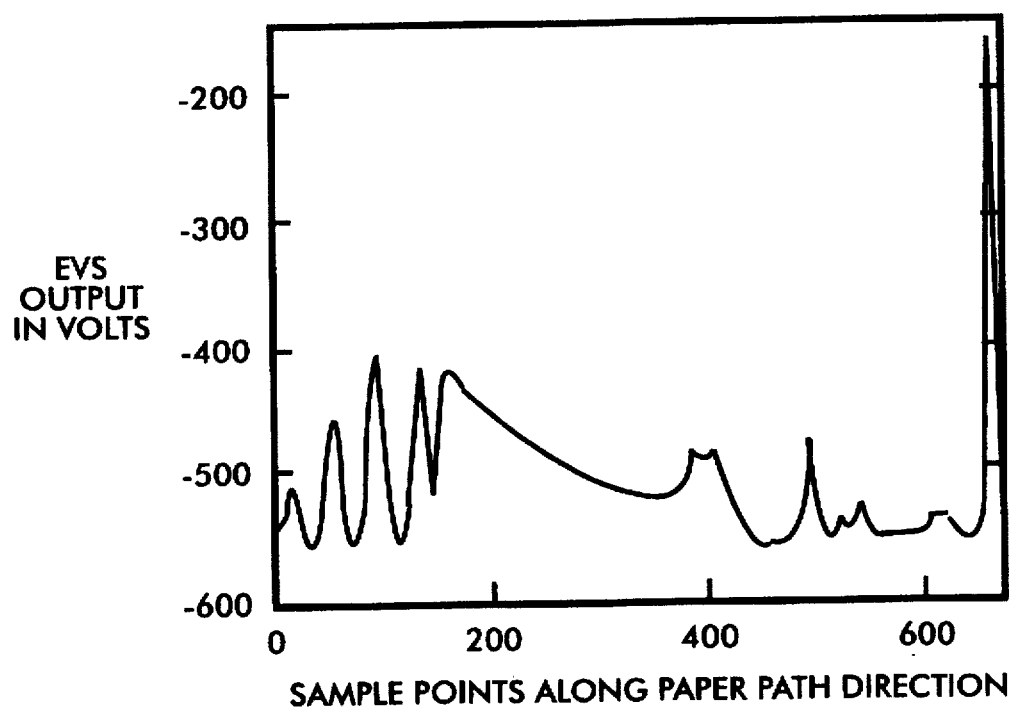
Figure 5B:
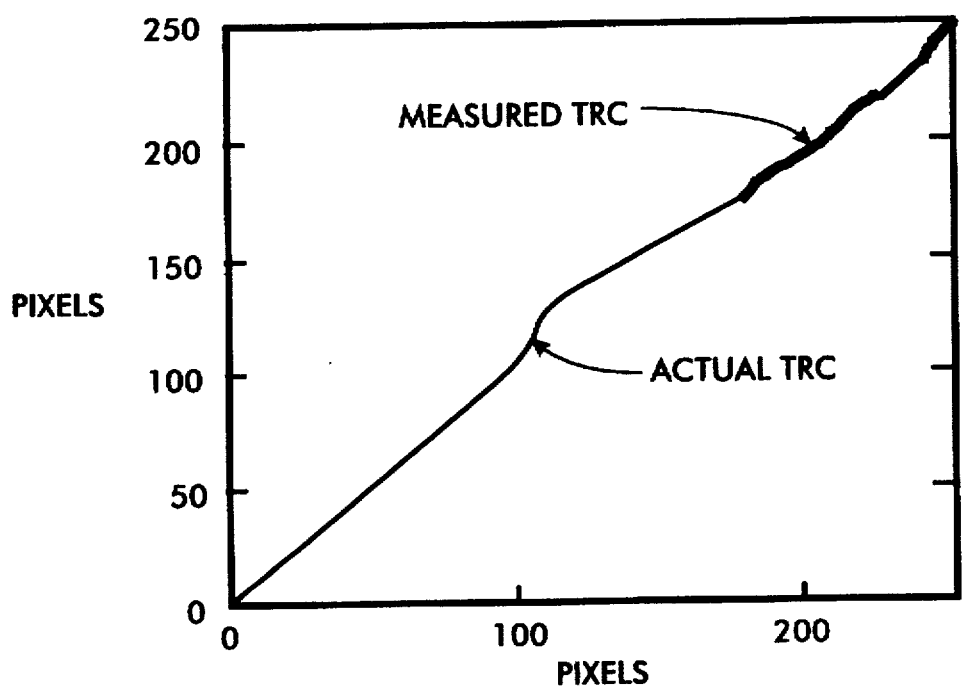
Figure 6A:
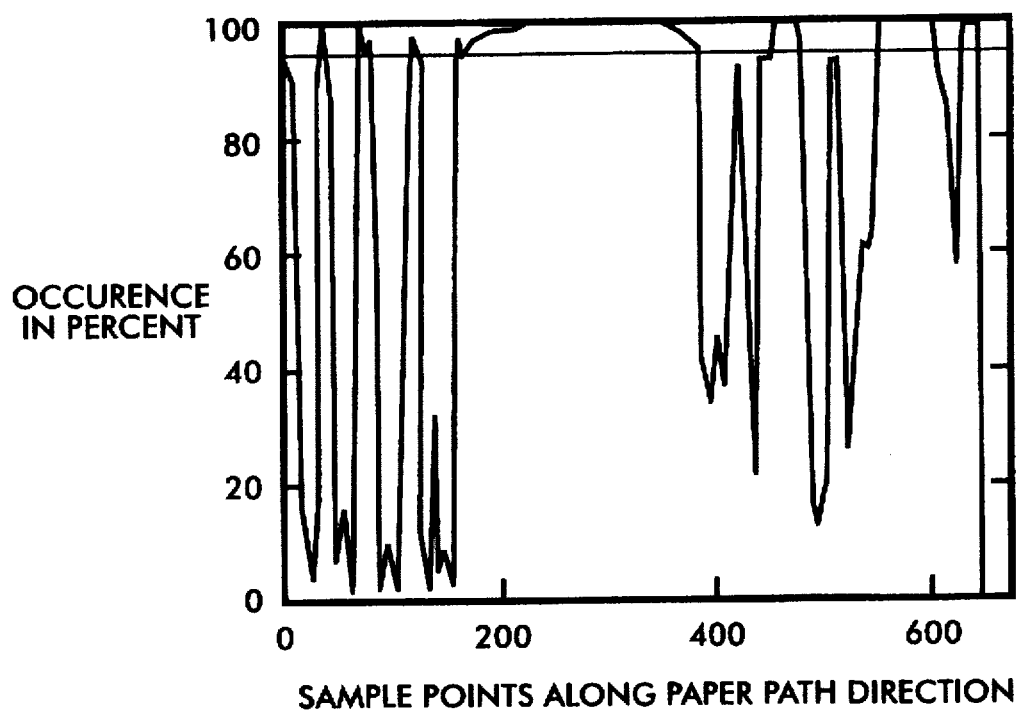
FIGS. 6A, 6B, 7A, 7B illustrate a second sample of histogram data, predicted sensor output, ESV output, and TRC curve in accordance with the present invention.
Figure 6B:
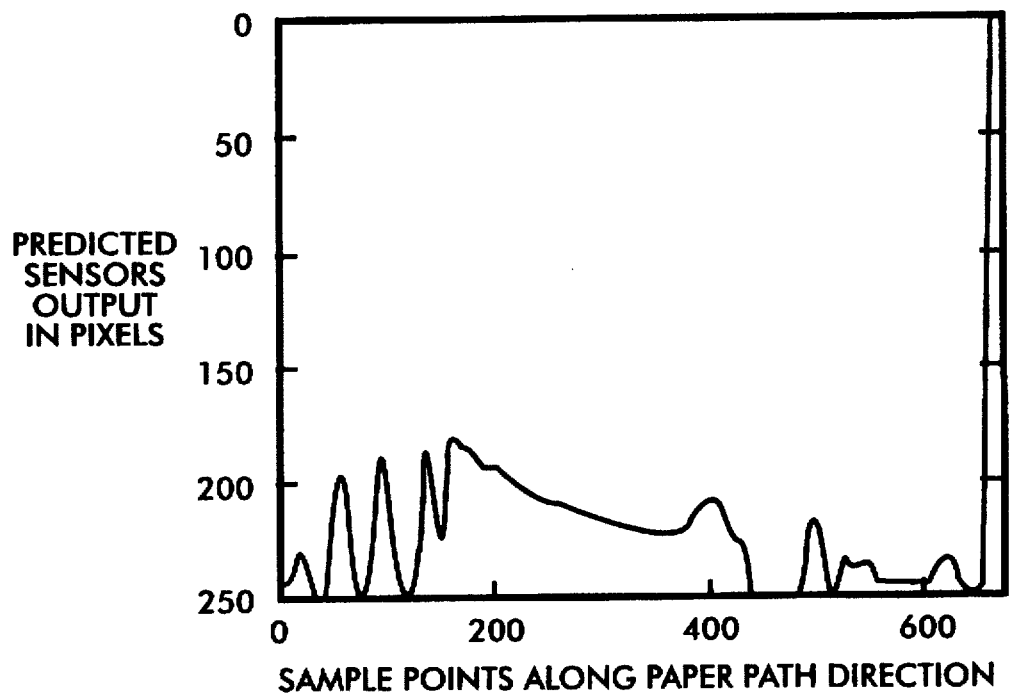
Figure 7A:
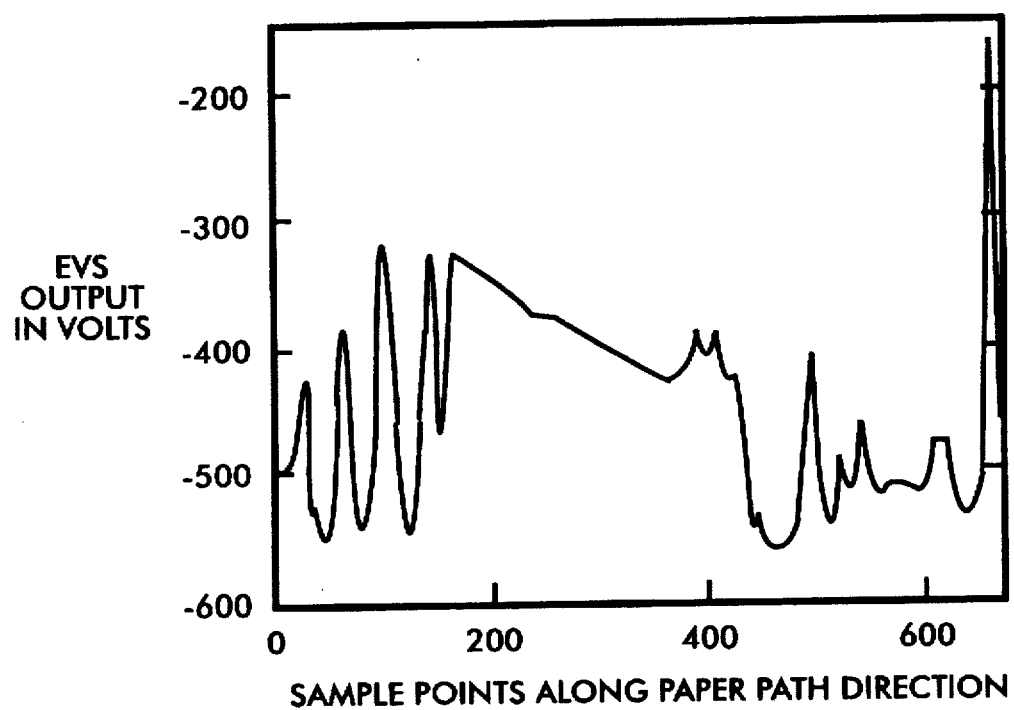
Figure 7B:
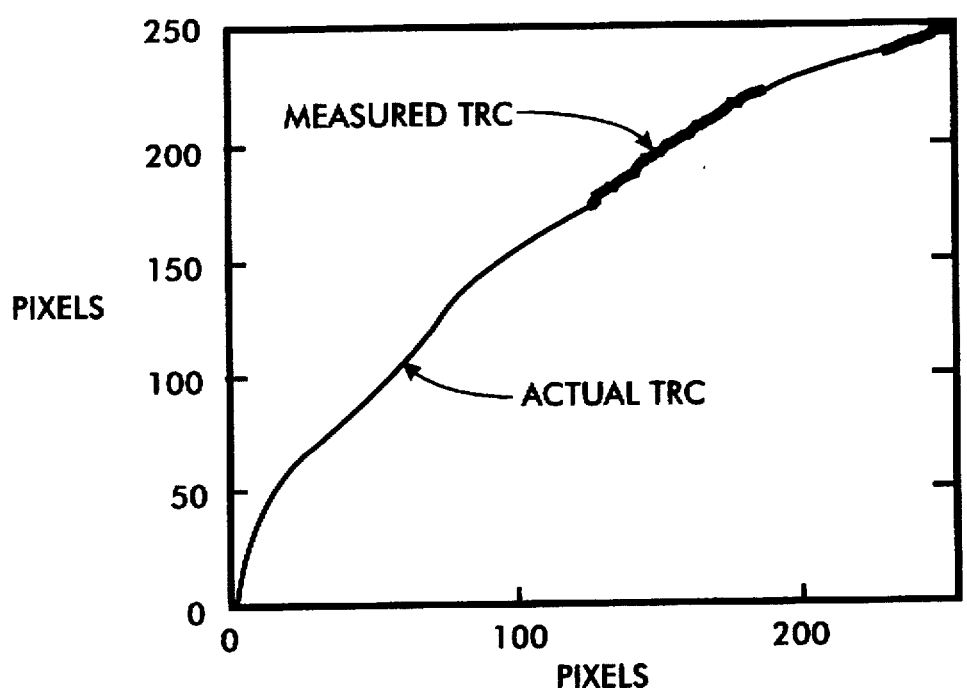
Figure 8A:
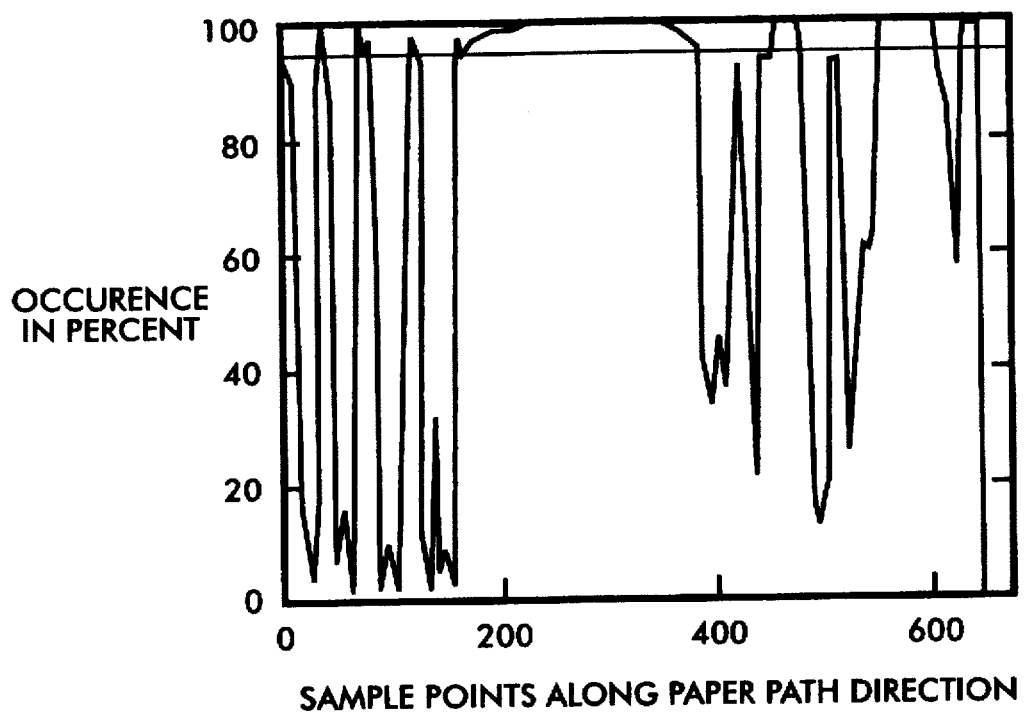
FIGS. 8A, 8B, 9A, 9B illustrate a third sample of histogram data, predicted sensor output, ESV output, and TRC curve in accordance with the present invention.
Figure 8B:
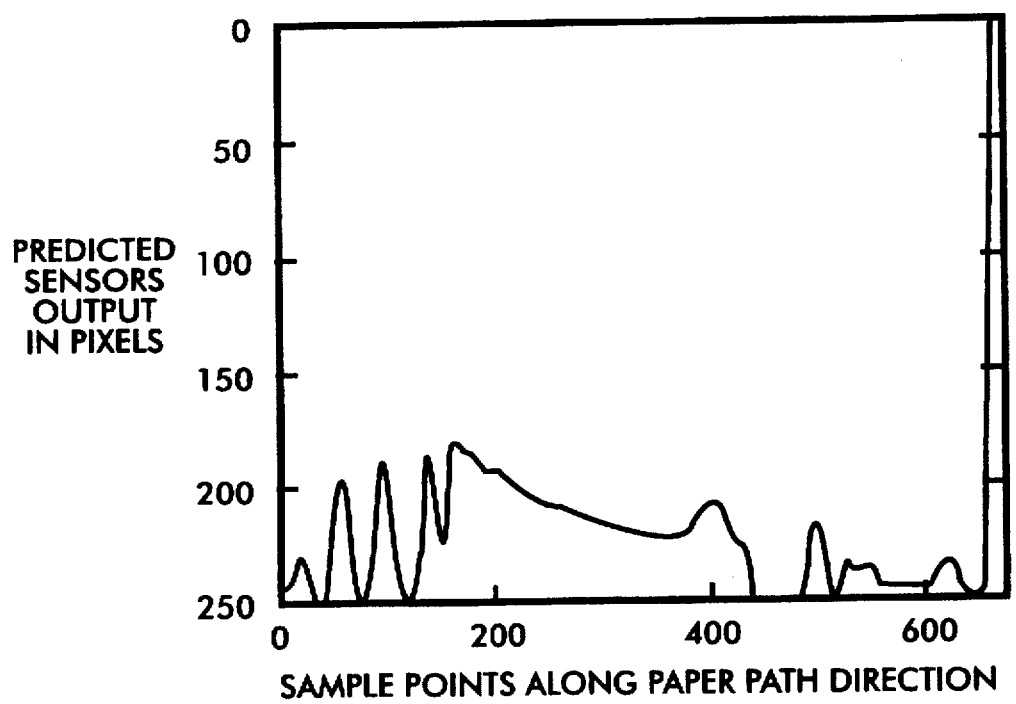
Figure 9A:
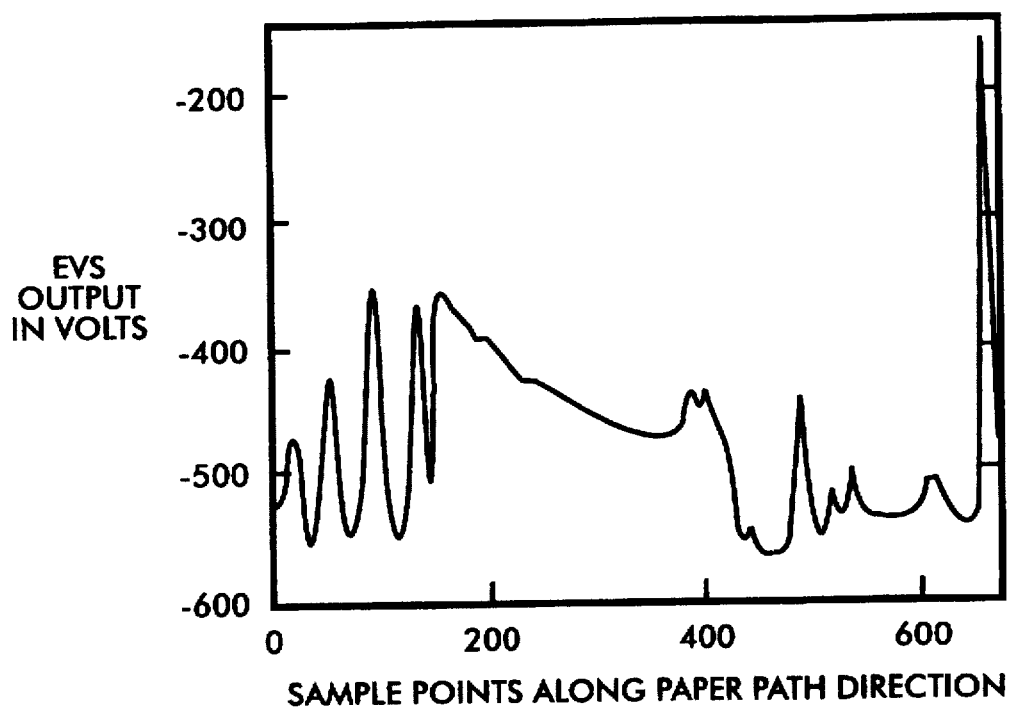
Figure 9B:
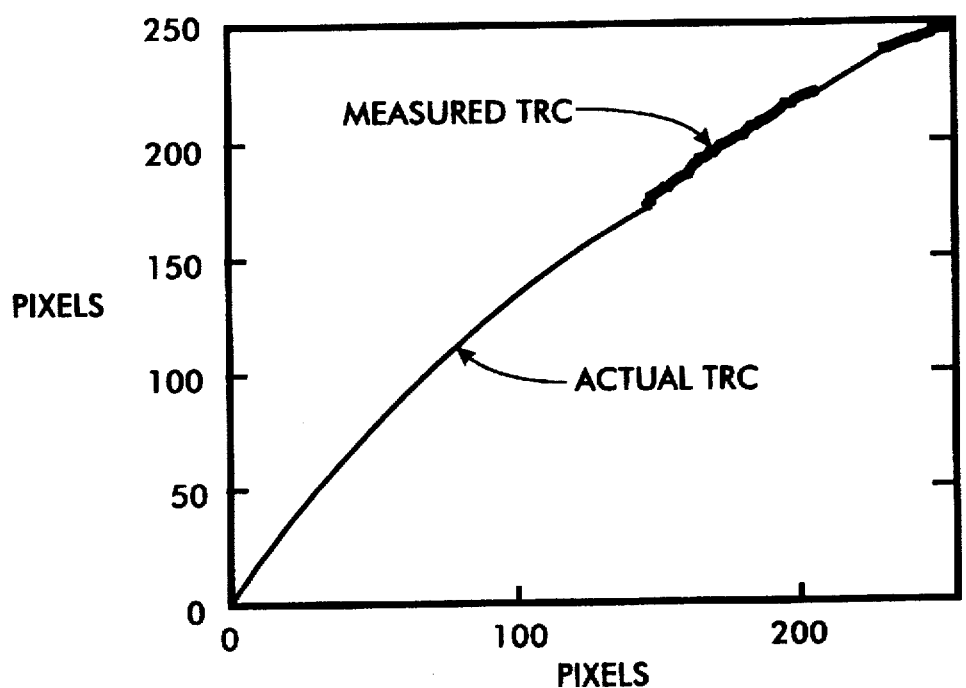

To confirm the technique of measuring the TRC from customer images, after characterizing the sensor, some representative test images were printed for three different TRCs. In FIGS. 4A–9B we show the experimental results. FIGS. 4A, 5A, 6A, 7A, 8A, and 9A represent the occurrence count data for a tolerance value of 10 that was obtained from the algorithm. FIGS. 4B, 5B, 6B, 7B, 8B, and 9B are the output of the sensor model for the representative test image along the sensor location. FIGS. 5A, 7A, and 9A are actual sensor readings acquired by sending the same test image through three different lookup tables in a hardware halftoner. FIGS. 5B, 7B, and 9B contain the signature of actual TRC (dotted curve) and the measured TRC data (solid curve), obtained one print each.

Clearly the correspondence between the measured and the actual TRC is good. Also, due to the availability of numerous data points in one print for a test image, it is possible to measure the structure on the TRC curve. The algorithm can be implemented in hardware with few shift registers, memory and combinational logic. Once the sensor can be characterized for a particular printer the measurement process can be setup online such that the data can be accumulated from arbitrary customer images as they are produced. In this way, the data bandwidth required for process control loops can be improved without the use of additional test patches.

While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. In a printing machine having a moving imaging surface, a projecting system for modulating a beam and projecting an image onto the imaging surface, a developer for application of toner to the image projected onto the imaging surface for transfer of the image to a medium, a method of development control comprising the steps of;

sensing a relatively small segment of an arbitrary image on the imaging surface, converting the sensed segment into a halftone density value; and responding to the halftone density value to adjust the machine operation for print quality correction.

2. The method of claim 1, wherein the step of converting the sensed segment into a halftone density value includes the step of converting into a plurality of halftone density values defining a tone reproduction curve.

3. The method of claim 1, wherein the step of converting the sensed segment into a halftone density value includes the step of discriminating between text, solid area, and halftone image elements.

4. The method of claim 1, wherein the step of converting the sensed segment into a halftone density value includes the steps of calculating a mean value of image input data and determining a variation of actual image bytes from the mean value.

5. The method of claim 4, including the step of comparing a preset tolerance value with each image byte.

6. A method of controlling a printing machine comprising the steps of;

forming a visible image of information being printed by the printing machine, sensing an arbitrary portion of the visible image of information being printed by the printing machine, and determining a plurality of halftone, values related to said sensing an arbitrary portion of the visible image of information being printed.

7. The method of claim 6, wherein the step of determining a plurality of halftone values related to said sensing an arbitrary portion of the visible image includes the steps of calculating a mean value of image input data and determining a variation of actual image bytes from the mean value.

8. The method of claim 7, including the step of comparing a preset tolerance value with each image byte.

9. The method of claim 7, including the step of controlling a process station in the printing machine as a function of the halftone values related to said sensing an arbitrary portion of the visible image of information being printed.

10. The method of claim 6, wherein the step of determining a plurality of halftone values related to said sensing an arbitrary portion of the visible image of information being printed includes the step of discriminating between text, solid area, and half tone image elements.

11. In a printing machine having a moving imaging surface, a projecting system for modulating a beam and projecting an image onto the imaging surface, a developer for application of toner to the image projected onto the imaging surface for transfer of the image to a medium, a method of development control comprising the steps of;

sensing a segment of an arbitrary image on the imaging surface with a spatially calibrated sensor, converting the sensed segment into halftone density values including the steps of calculating a mean value of image input data and determining a variation of actual image bytes from the mean value; and responding to the halftone density values to adjust the machine operation for print quality correction.

12. The method of claim 11, including the step of comparing a preset tolerance value with each image byte.

13. The method of claim 11, including the step of controlling a process station in the printing machine as a function of the halftone density values related to said sensing an arbitrary portion of the visible image of information being printed.

14. The method of claim 11 wherein the halftone density values define points on a tone reproduction curve.

15. In an imaging system with a sensor having an aperture and a viewing area, a method of analyzing an input byte data stream to define halftone segments by applying the sensor viewing area to the input data in accordance with the data acquisition rate from the sensor comprising the steps of:

defining "m" to be a normalized mean value of input image data, defining image pixels, p(i,j), to be the difference between "m" and actual image bytes, defining s(i,j) to be weightings attached to a sensor profile, determining a variation e(i,j) by subtracting the product of p(i,j) and s(i,j) from "m" where i and j represent the ith column and jth row of the image bytes, comparing a preset tolerance value to e(i,j); and if the preset tolerance is less than or equal to e(i,j) for a given image pixel in the sensor aperture, determining that there will be an occurrence of the image pixel for that particular tolerance.

16. The method of claim 15, wherein if all the image pixels, p(i,j), are less than or equal to e(i,j), then the total number of occurrences is considered equal to the number of pixels enclosed by the aperture.

17. The method of claim 15, wherein if some of the image pixels, p(i,j), are greater than e(i,j), then the total number of occurrences will be less than the total number of pixels enclosed by the aperture.

18. The method of claim 17, including the step of using a confidence value to distinguish relatively stable image data from high frequency changes.

19. The method of claim 18, including the step of defining all sensed areas above the confidence value as halftone images to determine a tone reproduction curve.

20. In an imaging system with a sensor having an aperture and a viewing area, a method of analyzing an input byte data stream to define halftone segments by applying the sensor viewing area to the input data in accordance with the data acquisition rate from the sensor comprising the steps of:

defining "m" to be a normalized mean value of input image data, defining image pixels, p(i,j), to be the difference between "m" and actual image bytes, defining s(i,j) to be weightings attached to a sensor profile, determining a variation e(i,j) by subtracting the product of p(i,j) and s(i,j) from "m" where i and j represent the ith column and jth row of the image bytes, comparing a preset tolerance value to e(i,j), if the preset tolerance is less than or equal to e(i,j) for a given image pixel in the sensor aperture, determining that there will be an occurrence of the image pixel for that particular tolerance, determining the number of image pixels, p(i,j), that are greater than e(i,j); and defining all sensed areas with respect to a given confidence value of image pixels with a preset tolerance less than or equal to e(i,j) as halftone images.

21. The method of claim 20, including the step of using all sensed areas with respect to a given confidence value of image pixels with a preset tolerance less than or equal to e(i,j) to define a tone reproduction curve.

22. In an imaging system with a sensor having an aperture and a viewing area, a method of analyzing an input byte data stream comprising the steps of:

defining image pixels in terms of the difference between a normalized mean value of input image data and actual image bytes, defining weightings attached to a sensor profile, determining a variation of said image pixels based upon said difference and said weightings, providing a comparison of the variation to a preset tolerance; and using the comparison to define halftone segments of the input byte data stream.

23. A method of development control by storing a reference tone reproduction curve and sensing a relatively small segment of an arbitrary image on an imaging surface comprising the steps of:

converting the relatively small segment of the arbitrary image on the imaging surface into suitable density values, the density values being at least one of background, solid area, and halftone images, responding to the density values to compare to the reference tone reproduction curve and define points on an adjusted tone reproduction curve; and responding to the adjusted tone reproduction curve to change machine operation for print quality correction.

* * * * *